(No Model.)
M. E. STEPHENSON.
BICYCLE BRAKE.
No. 541,698.  Patented June 25, 1895.
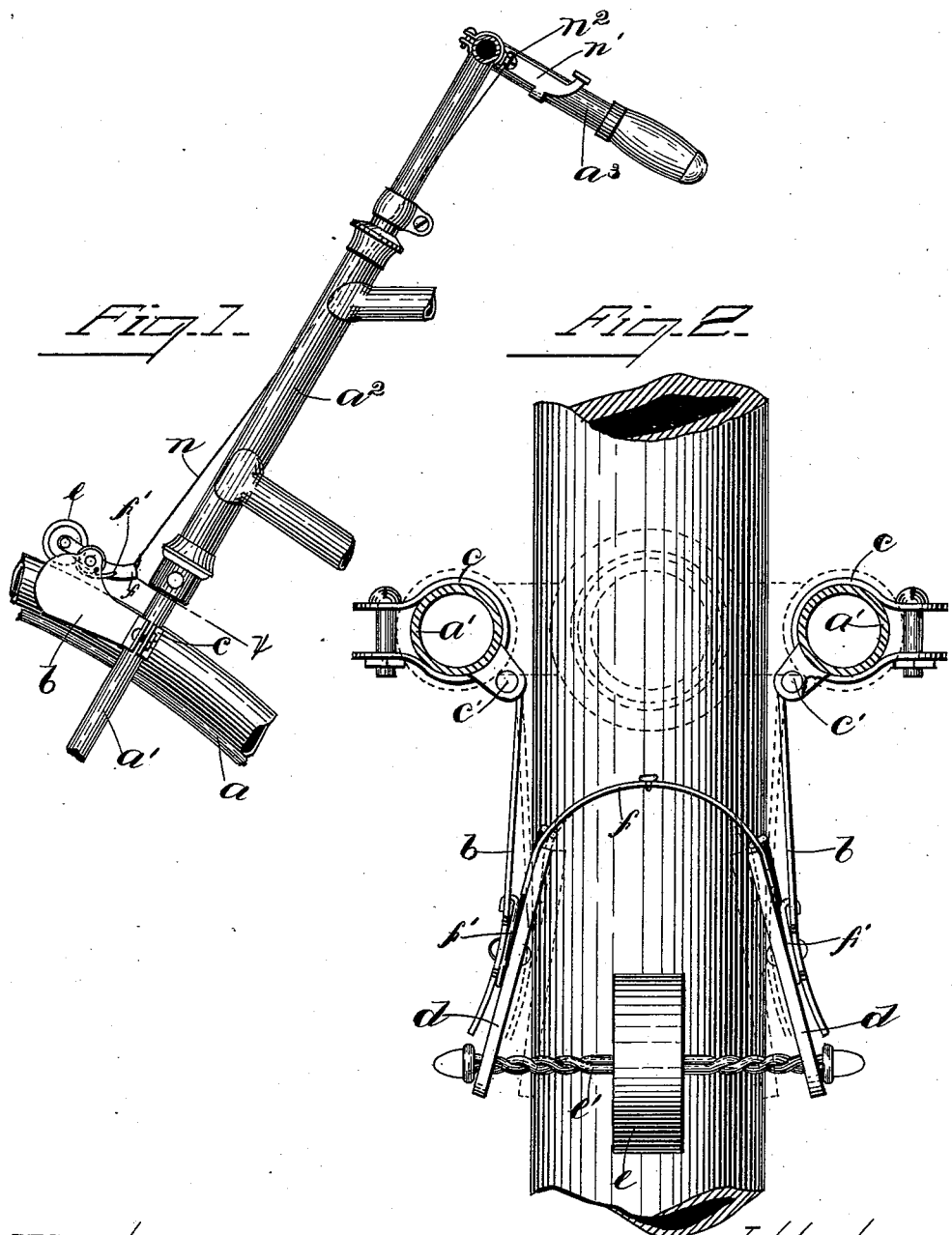
WITNESSES
Charles V. Crocker.
Florence H. Davis.
INVENTOR
Milton E. Stephenson
by B. J. Ivy
Atty.

UNITED STATES PATENT OFFICE.

MILTON E. STEPHENSON, OF BOSTON, MASSACHUSETTS.

BICYCLE-BRAKE.

SPECIFICATION forming part of Letters Patent No. 541,698, dated June 25, 1895.

Application filed October 9, 1894. Serial No. 525,347. (No model.)

*To all whom it may concern:*

Be it known that I, MILTON E. STEPHENSON, of Boston, county of Suffolk, State of Massachusetts, have invented an Improvement in Bicycle-Brakes, of which the following description, in connection with the accompanying drawings, is a specification, like letters on the drawings representing like parts.

This invention has for its object to improve the construction of bicycle brakes, it being especially adapted for use on bicycles having pneumatic tires, and furthermore being applicable to bicycles already in use.

The invention consists in the combination of a pair of plates located upon opposite sides of the pneumatic tire, and movable toward and from said tire so that by acting upon the sides thereof the progress of the machine will be checked, and suitable means, operated by the wheel for drawing said side plates into engagement with the tire, and a hand operated lever or equivalent device for throwing the parts into operation.

The means herein shown for drawing in the side plates consists of a small wheel or roller arranged above the tread face of the wheel, between the side plates, and secured to a short shaft, the ends of which are formed as spirals or screws, right and left threaded respectively, said spirally formed ends passing through elongated or other shaped holes formed in arms secured to the side plates so that as said shaft is revolved, as it will be by the contact of the wheel or roller with the tread face of the tire, said side plates will be drawn into engagement with the sides of the tire. The arms through which the spirally formed ends of the roller carrying shaft project, are pivoted to the side plates, so that they may be turned on their pivots to throw the roller into and out of contact with the tread face of the tire. These arms are also herein represented as joined together at their rear ends by a bow spring, the action of which is to normally spread the arms apart, thereby holding the side plates out of engagement with the tire.

A hand lever or other device is arranged on the cross bar of the machine which is connected with the arms, as for instance to the bow spring, for simultaneously turning them on their pivots, and thereby throwing the roller into contact with the tread face of the pneumatic tire.

Figure 1 shows in side elevation a bicycle-brake embodying this invention; Fig. 2, a plan view of the essential parts of the brake.

The wheel $a$ having a pneumatic or other tire, the front fork $a'$, steering post $a^2$, and cross bar $a^3$ are all as usual in bicycles. Side plates $b, b$, are arranged at opposite sides of the pneumatic tire, they being hinged or pivotally connected to the front fork $a'$, as for instance by means of clamps $c$ embracing the front fork and bearing pivot pins $c'$, or they may be otherwise supported, so as to be moved into and out of engagement with the sides of the pneumatic tire. To each side plate $b$ an arm $d$ is pivoted at a point about midway between its ends. Between the front ends of said arms $d, d$, a wheel or roller $e$ is arranged just above the tread face of the tire, being secured to a short shaft $e'$, each end of which is formed as a spiral or screw, as for instance said shaft may be made of two wires, the ends of which are twisted together but in opposite ways, so that right and left screw threads are formed. The spirally or screw formed ends of the shaft pass through elongated or other shaped holes in the ends of the arms $d, d$, so that as said shaft is rotated the arms $d, d$, and side plates connected thereto will be drawn toward each other.

The inner ends of the arms $d, d$, are joined together by a bow spring $f$, the tendency of which is to normally spread the arms $d, d$, apart, so that after they have been drawn toward each other by the rotating wheel-carrying shaft $e'$, they may be restored to their normal position.

Small coiled springs $f'$ surround the pivots of the arms $d, d$, being connected with the side plates, the tendency of which is to normally keep said arms with their forward ends elevated, in order that the wheel or roller $e$ may be held a short distance above the tread face of the tire.

It will be observed that the arms $d, d$, and bow spring $f$ joining them together, form a yoke, the outer or free ends of which support the shaft and roller carried by it. A cord or chain $n$ is connected with this yoke, as for instance to the bow spring, which passes up alongside the steering post, or it may be through said post, and is connected at its upper end with one end of a hand lever $n'$ pivoted at $n^2$, to the cross bar, so that by simply depressing said hand lever said yoke will be turned on its pivots, throwing the wheel or roller $e$ into contact with the tread face of the felly.

The operation of the device is as follows:—
The hand lever $n'$ is depressed, and the wheel or roller $e$ thrown into contact with the tread face of the pneumatic tire, and at once said wheel or roller begins to revolve, turning the spiral shaft $e'$, drawing the side plates $b$, $b$, into engagement with the sides of the pneumatic tire, and thereby checking the progress of the wheel, and by releasing said hand lever the springs $f'$, $f'$, turn the yoke, raising the wheel free from contact with the tire, and the spring $f$ then acts to spread the arms $d$, $d$, restoring the side plates $b$, $b$.

It will be seen that the side plates $b$ $b$, which check the progress of the machine, act upon the sides of the tire, parts thereof not subjected to any material wear, and furthermore that the device is simple, easily made, and applied to bicycles of the many different makes already in use.

I claim—

1. In a bicycle brake, the combination of a pair of side plates, movable toward and from the sides of the tire of the wheel, means operated by the wheel for drawing said side plates into engagement with the tire, and a hand operated device connected therewith for throwing the parts into operation, substantially as described.

2. In a bicycle brake, the combination of a pair of side plates movable toward and from the sides of the tire of the wheel, an expansible yoke pivotally connected thereto, a right and left threaded shaft turning in said yoke, a roller carried by it adapted to contact with the tread face of the tire of the wheel, and a hand operated device for turning said yoke on its pivot, substantially as described.

3. In a bicycle brake, the combination of a pair of side plates movable toward and from the sides of the tire of the wheel, arms $d$, $d$, pivoted thereto, a bow spring joining their inner ends, a right and left threaded shaft at their forward ends, a roller carried by it, a hand lever connected with the bow spring by a cord or chain for throwing the roller into contact with the tread face of the tire, and springs as $f'$ for raising said roller, substantially as described.

4. In a bicycle brake, the combination of a pair of side plates movable toward and from the sides of the tire of the wheel, detachable supports therefor, means operated by the wheel for drawing said side plates into engagement with the tire, and a hand operated device connected therewith for throwing the parts into operation, substantially as described.

In testimony whereof I have signed my name to this specification in the presence of two subscribing witnesses.

MILTON E. STEPHENSON.

Witnesses:
B. J. NOYES,
FLORENCE H. DAVIS.